United States Patent [19]

Lagercrantz

[11] Patent Number: 5,148,091
[45] Date of Patent: Sep. 15, 1992

[54] ARRANGEMENT FOR BRINGING THE TOOL-CARRYING END OF A ROBOT BEAM TO A DESIRED ONE OF A PLURALITY OF POSSIBLE PREDETERMINED POSITIONS

[76] Inventor: Fredrik B. B. Lagercrantz, Nässelvägen 1, 193 00 Sigtuna, Sweden

[21] Appl. No.: 689,791
[22] PCT Filed: Nov. 24, 1989
[86] PCT No.: PCT/SE89/00685
   § 371 Date: May 17, 1991
   § 102(e) Date: May 17, 1991
[87] PCT Pub. No.: WO90/06214
   PCT Pub. Date: Jun. 14, 1990

[30] Foreign Application Priority Data

Nov. 28, 1988 [SE] Sweden ............................ 8804305

[51] Int. Cl.$^5$ ............................................. G05B 19/10
[52] U.S. Cl. ........................... 318/568.11; 901/1; 901/27; 901/28
[58] Field of Search ............ 318/560, 561, 567, 568.1, 318/568.11, 568.12, 568.13, 568.21, 568.23, 569; 901/1, 2, 9, 19, 14, 27, 28, 29, 30, 50; 414/729, 730, 735

[56] References Cited

U.S. PATENT DOCUMENTS

| 4,011,437 | 3/1977 | Hohn | 318/568.23 X |
|---|---|---|---|
| 4,718,815 | 1/1988 | Lindgren | 901/27 X |
| 4,725,193 | 2/1988 | Sticht | 901/27 X |
| 4,759,674 | 7/1988 | Schroder et al. | 901/1 X |
| 4,762,459 | 8/1988 | Morita et al. | 901/28 X |
| 4,872,363 | 10/1989 | Rosenthal | 901/28 X |
| 4,904,152 | 2/1990 | Doi et al. | 318/568.11 X |
| 4,948,329 | 8/1990 | Fuse et al. | 901/1 X |
| 4,993,912 | 2/1991 | King et al. | 901/1 X |

FOREIGN PATENT DOCUMENTS

0314839A1 10/1989 European Pat. Off. .

Primary Examiner—William M. Shoop, Jr.
Assistant Examiner—David Martin
Attorney, Agent, or Firm—Burns, Doane, Swecker & Mathis

[57] ABSTRACT

The present invention relates to an arrangement for bringing the tool-carrying end (2) of a robot beam (4) to one desired position of a plurality of possible, predetermined positions, and a workpiece-supporting table-assembly for use with a robot beam steered by the arrangement. The beam-positioning arrangement comprises two beam-holding devices (5, 6) which are intended to support the beam (4) at given mutually-space locations along its length and which are journalled to the beam at the aforementioned locations. At least one of the beam-holding devices (6) is slideably mounted for movement along a first elongated beam-positioning arm (10) and one end of the first arm is pivotally connected to a stand (12) which is moveable along a fixed path. The arrangement is such that pivotal movement of the first arm (10) and movement of the at least one holding-device (6) along its arm will result in a commensurate change in the positional setting of the tool-carrying end of the beam.

20 Claims, 2 Drawing Sheets

5,148,091

ARRANGEMENT FOR BRINGING THE TOOL-CARRYING END OF A ROBOT BEAM TO A DESIRED ONE OF A PLURALITY OF POSSIBLE PREDETERMINED POSITIONS

TECHNICAL FIELD

The present invention relates to an improvement in arrangements by means of which the tool-carrying end or free-end of a robot beam can be brought to a selected one of a plurality of predetermined positions. The invention can be applied with robot beams which comprise a single elongated element or a plurality of mutually telescopic beam-sections. The arrangement includes two beam-holding devices which are intended to support the beam or beam-structure pivotally at given spaced locations along its length, and is intended to cooperate with a workpiece-support table-assembly constructed for this purpose in accordance with the invention, said table assembly being coordinated for movement with the tool carried at one end of the robot beam.

BACKGROUND PRIOR ART

There are known to the art various kinds of arrangements by means of which the tool-carrying end of a robot beam can be moved to a given one of a plurality of predetermined positions and which can be used with robot beams which comprise at least two telescopic sections or one single beam-element. In the case of these known beam-steering arrangements, the robot beam, or a given beam-section, is held by a first holding device which is pivotally and displaceably mounted, so as to enable the tool-carrying end of the robot beam to be moved to specific, pre-determined positions.

The free-end of the robot beam has mounted thereon means for accommodating workpiece definning, deburring, drilling or milling tools, or alternatively abrasive discs or wheels for grinding cast-metal workpieces.

Also known to the art are table assemblies which comprise a top table-part having an upper table surface on which a workpiece can be firmly mounted, and a lower table-part which is pivotally journalled to a stand which rests on an underlying foundation surface, such as a floor.

Such table assemblies are intended to coact with an arrangement for adjusting the free-end of a robot beam to a pre-determined position, wherewith activation of the robot beam and the table assembly is coordinated in a manner such as to enable the workpiece to be worked in the manner desired.

It is also known to provide table assemblies of this kind with means whereby the assembly can be controlled and will be stable.

Also forming part of the known prior art are coordinate tables or platens which have an upper table surface on which a workpiece can be mounted and which can be displaced along two mutually perpendicular coordinates.

SUMMARY OF THE PRESENT INVENTION

TECHNICAL PROBLEMS

When considering the present state of the art, as described in the aforegoing, it will be seen that primarily a technical problem resides in the provision of an arrangement by means of which the tool-carrying end of a robot beam can be moved to a predetermined position among a plurality of available predetermined positions and to realize those advantages which are afforded with respect to simplified steering and precise positioning of the tool-carrying or free-end of the robot beam when the beam, or in the case of a beam comprising two or more telescopically arranged beam sections, one of said beam sections is held by two holding devices which are mutually spaced apart and at least one of which is intended to coact with a beam-positioning arm which is pivotally mounted at one end thereof, while enabling the at least one holding device to be moved up and down along said arm and therewith make commensurete adjustments to the attitude of the beam or beam structure.

Another technical problem is one of realizing the combination effects that can be afforded, and to which the particular attachment of the robot beam in the holding devices relates, when both arms are arranged for sliding movement along a respective arms which are pivotally journalled at one end thereof, and by causing the arms to coact with a stand which can be moved along a path through distances contingent on the measurement of work to be carried out on a workpiece.

It will also be seen that a further technical problem is one of enabling the tool-carrying or free-end of the robotic arm to be moved precisely to predetermined positions, by providing five degrees of freedom in which the beam can be guided.

It will also be seen that a further technical problem is one of realizing the advantages which are gained when the pivotally mounted beam-steering arms diverge from their points of pivotal attachment within an angular range of up to 45°, preferably between 15° and 30° within the range most used.

In the case of a beam-structure which comprises at least first and second mutually telescopic beam-sections, it will also be seen that a technical problem is one of realizing the advantages that are afforded when the first beam-section and the second beam-section are connected together for rotation of one beam-section relative to the other, for instance with the aid of a toothed connecting ring and a rotary drive-motor and when a further degree of freedom is provided, despite the connection of an abrasive disc to a drive motor through the intermediary of a flexurally rigid shaft which extends through the beam-sections.

Another technical problem is one of realizing the advantages that are afforded when the first holding device and the second holding device can be moved up-and-down respective arms with the aid of first and second linear positioning devices or servo-motors.

Still a further technical problem is one of realizing the advantages that are afforded when a third linear-positioning device is arranged between the pivotally mounted end of the second arm and the first holding device, or adjacent the first holding device, so as to impart a tilting motion to the robot-beam.

Another technical problem is one of providing first and second holding devices of mutually identical configuration which form a slide that is capable of being displaced along slide surfaces provided on said arms, and therewith achieve considerable simplifications in construction and manouverability of a beam-positioning arrangement.

Another technical problem resides in the provision of a table assembly, comprising a top table-part having an upper table-surface on which a workpiece can be mounted, particularly when the workpiece is to be machined or worked by means of a tool, such as an abrasive disc or wheel, mounted on the free-end of the robot beam, and therewith provide a table assembly which not only affords stable coaction between rotatably mounted components but which also enables the position of the workpiece to be adjusted readily in combination with adjustments of the tool position, such as to facilitate machining or working of the workpiece.

It will also be seen that a further problem is one of providing an adjustable table assembly and an adjustable robot beam, provided with requisite attachment and control facilities, where both the table assembly and the robot beam can be mutually controlled from a computerized control unit, so as to enable castings or other workpieces to be machined or worked over the whole of their free surfaces.

In the case of table assemblies of known kinds, a further technical problem is one of realizing the advantages that are gained by connecting a lower table-part to a floor stand for rotatable movement about a vertical shaft, and to also realize that the upper surface of said lower table-part shall be arranged to support and to hold bearing blocks so as to enable, via a horizontal shaft, an intermediate table to be mounted which, in turn, supports said table-top, thereby to provide many degrees of freedom such as to enable the workpiece to be adjusted to a position in which even not-readily accessible surfaces of the workpiece can be reached.

It will also be seen that a further technical problem resides in the provision of simple and flexurally-rigid coaction between the intermediate table and the table-top.

Another technical problem resides in the provision of a table assembly in which an imaginary extension of the centre axis of the vertical shaft and the centre axis of the horizontal shaft will intersect one another and therewith realize the advantages that are afforded when the desired rotation can be controlled in a simple manner and with less compensation.

A further technical problem is one of realizing the advantage that is afforded when the floor stand and the table-part are pivotally mounted for rotation through 360° while mounting the intermediate table and the table-top for rotation through 360°, and therewith to provide a horizontal shaft about which the intermediate table can rotate through an angle of 90°, for the purpose of solving the aforesaid technical problem.

It will also be seen that a technical problem is one of providing a table assembly of the aforesaid construction with the requisite, controllable rotational motors in a manner which will enable rotation to be effected in a controlled, precise and simple manner.

SOLUTION

The present invention relates to an arrangement for adjusting the free-end of a robot beam to one given position of a plurality of available pre-determined positions, wherein in accordance with one embodiment of the arrangement the beam whose movements ar steered by said arrangement may have the form of a single beam-element or may comprise at least two mutually telescopic sections, of which a first section is held by at least one beam-holding device and a second section of which presents said tool-carrying free-end of the beam structure.

In accordance with one embodiment of the present invention, the arrangement includes a first holding-device which supports one end-part of the beam and which can be moved up-and-down a first arm which is pivotally mounted at one end thereof. A second holding device spaced axially of the first holding-device is operative to support the beam at a beam-location in the vicinity of the free-end of the beam and can be moved up-and-down a second arm which is pivotally mounted at one end thereof, wherein the pivotal connections of said arms at said one end thereof are located on a stand which can be moved along a precisely defined path.

In accordance with suitable embodiments lying within the scope of the inventive concept in these instances when the beam comprises first and second beam-sections, said sections are rotatably connected to one another, such as to enable said sections to rotate relative to one another and therewith to rotate a tool or the like carried on the free end of one said section.

The one end-part of the beam or beam structure can carry a motor and the other end of the beam, or the free-end of the second beam-section, can then carry an abrasive disc or like rotatable device.

In accordance with one embodiment of the invention, the torque generated by the motor is transmitted to the rotatable abrasive disc or tool by means of a splined shaft, and a linear positioning device is provided for moving the second beam-section into and out of the first beam-section, in the case of a two-section beam structure.

It is also proposed that the stand has the form of a carriage which can be moved along a path provided with guides.

The first and the second holding devices are each moved along their respective arms by means of a respective linear positioning device, or servomotor.

A linear positioning device is also provided between the bottom end of the second arm and the pivotally mounted end and the first holding device, or adjacent the first holding device, so as to swing the robot beam backwards and forwards.

It is also suggested that the first holding device and the second holding device are pivotally mounted at a mutual distance apart on the beam, or on a first first beam-section beam and that each device has the form of a slide which can be moved along slide surfaces incorporated in said arms.

This displacement of the stand or carriage along the path is controlled by a motor or a positioning device.

Respective arms consist of a framework structure with the robot beam located between two mutually parallel arm-parts which form slide-guide surfaces.

The invention also relates to a table assembly which is intended for use with a robot-beam controlled by the inventive arrangement and comprising a table-top having an upper table-surface on which a workpiece can be mounted, a stand which rests on a foundation surface, and a lower table-part which is pivotally connected to the stand.

In accordance with the present invention, the lower table-part is journalled on the stand for rotary movement about a vertical shaft and mounted on the upper surface of the lower table-part are bearing blocks on which an intermediate table, which supports the table-top, is journalled for movement about a horizontal shaft, such as to obtain many degrees of freedom for adjustment of the position of the workpiece, so that not-readily machined parts can be worked by a tool attached to the free-end of a robot beam, the one section of which is held by two holding devices which can be raised and lowered along a respective arm pivotally mounted at the lower ends thereof, said arms diverging away from their pivotal attachment points at an angle smaller than 45° when occupying a normal setting position.

In accordance with a further development of the invention, the intermediate table and the table-top coact rotatably with one another via a "vertical" shaft.

An imaginary extension of the centre axis of the "vertical" shaft and the centre axis of the horizontal shaft will intersect one another.

The centre axis of the shaft intended for the coaction of the intermediate table with the table-top is intended to intersect the centre axis of the horizontal shaft.

The floor stand and the lower table-part are mounted for rotation through an angle of 360° with the aid of a first rotational motor, whereas the intermediate table and the table-top are mounted for rotation through 360° with the aid of a second rotary motor.

The intermediate table is rotatably connected to a horizontal shaft mounted on bearing blocks, and the intermediate table is mounted for rotation relative to a horizontal plane, with the aid of a linear positioning device. Rotation in this latter case need not normally exceed 90°.

Finally, the lower table-part coacts with a first rotary motor for rotation of said lower table-part relative to the floor stand, and a second rotary motor is mounted adjacent one bearing block and secured in the intermediate table, for rotation of the table-top relative to the intermediate table.

ADVANTAGES

Those advantages primarily afforded by the inventive arrangement intended for adjusting the free-end of a robot beam to a given one of a plurality of available, pre-determined position, in accordance with the present invention, reside in the possibility of bringing the free-end of said beam to an accurate position with the aid of simple control devices and simple means.

In combination with a table-assembly of particular construction, having a rotatable upper table-surface and an intermediate table capable of being rotated about a horizontal shaft, there is afforded the possibility of adjusting the position of a workpiece in a manner which is particularly well adapted for cooperation with an arrangement for locating the free-end of a robot beam in a pre-determined position, so as to be able to machine effectively the not-readily reached parts of a workpiece of irregular shape.

The primary characteristic features of an arrangement according to the present invention are set forth in the characterizing clause of the following claim 1, while the primary characterizing features of a table assembly constructed in accordance with the present invention are set forth in the characterizing clause of the following claim 12.

BRIEF DESCRIPTION OF THE DRAWINGS

Preferred embodiments of an arrangement for bringing the tool-carrying end of a robot beam to a desired one of a plurality of possible predetermined positions will now be described with reference to the accompanying drawings, together with a preferred table-assembly intended for use together with the aforesaid arrangement. In the drawings.

DESCRIPTION OF EMBODIMENTS AT PRESENT PREFERRED

Figure 1:
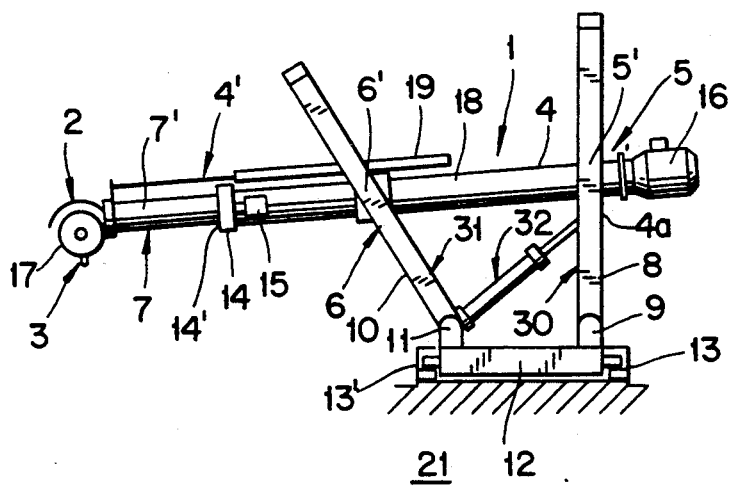
FIG. 1 is a schematic side-view of an arrangement which includes a telescopic robot beam supported at two locations therealong by two holding devices, each of which coacts with a respective beam-moving arm.
Figure 6:
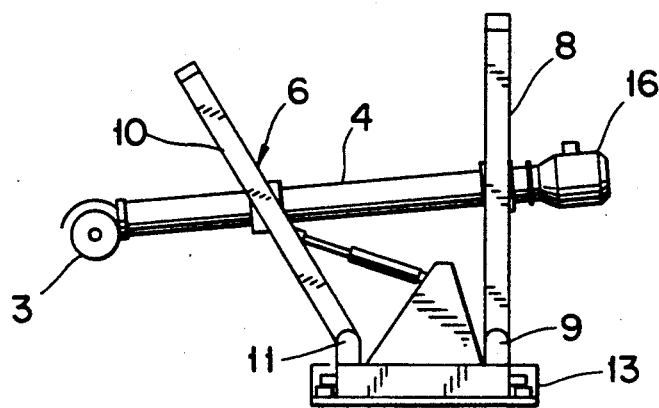
FIG. 6 is a schematic side-view of an arrangement as shown in FIG. 1 but with a non-telescopic robot beam.

FIG. 1 illustrates in side view an arrangement according to one embodiment of the invention, by means of which the tool-carrying or free-end 2 of a robot beam 1 can be brought to a desired one of a number of possible, predetermined positions which are located in three-dimensional space and which, in each case, lie adjacent the outer surface of a workpiece. The reference 3 identifies a tool, in this case an abrasive wheel or disc, carried on the free-end 2 of the beam 1. Although the beam 1 illustrated in FIG. 1 comprise first and second mutually telescopic sections, it will be understood that the inventive arrangement can be used equally as well with a robot beam which comprises one single beam-element, as illustrated in FIG. 6, and consequently single-element beams and two-section beams will be described in the following with reference to FIGS. 1 and 6.

There are known to the art various kinds of computer-controlled assemblies which, with the aid of linearly-acting positioning devices, are operative to steer robot tool-carrying beams in the vicinity of a workpiece held on a table surface, such as the surface 40 of the illustrated table-assembly (FIG. 4), and to cause the tool, e.g. an abrasive wheel, to follow the external contours of the workpiece while carrying out specific working operations.

In order to be able to machine parts of the workpiece which are not readily accessible, it is normally necessary to move the workpiece, in addition to the tool. For the sake of simplicity, such facilities have not been shown here.

The arrangement illustrated in FIG. 1 is intended for use with a robot beam 4 which consists of an elongated element having at least two telescopic sections. The beam is supported at given, mutually spaced locations along its length by first and second beam-holding devices 5, 6. The first holding device 5 is intended to hold one end-part 4a of the beam 4 and is mounted for sliding movement along a first arm 8, which is pivotally mounted on a floor stand or carriage 12 by means of a pivot journal 9. FIG. 1 shows the arm 8 in its vertical position.

Figure 5:
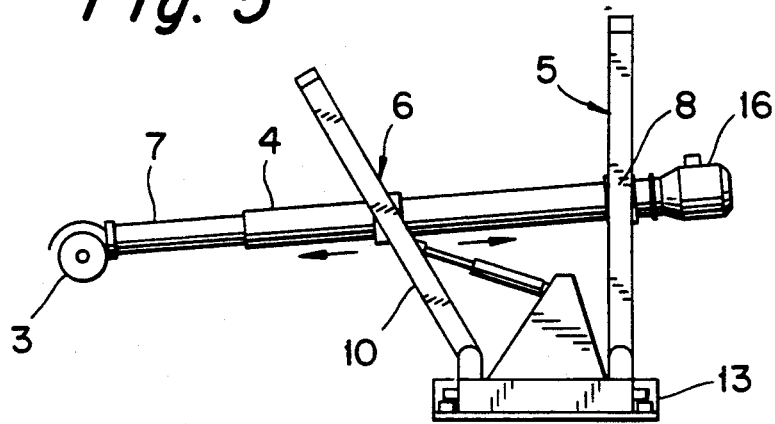
FIG. 5 is a schematic side-view of an arrangement which includes a telescopic robot beam supported by a "fixed" holding device or arm.

It will be understood, however, as shown in FIG. 5, that the arm 8 may be fixed to the floor stand 12, so as to be permanently upstanding, and that the beam may be connected to the top of the arm 8 by means of a rotational bearing which will enable the beam to pivot and rotate about its longitudinal axis. In the latter case, the holding device 5 will still be mounted for sliding movement up and down the arm 8.

The second beam-holding device 6 is mounted at a location midway along the length of the beam, or alternatively at a location which is closer to the tool-carrying end of the beam than the midway beam-point. This second holding device 6 is mounted for movement along a second arm 10, which is pivotally connected to the stand or carriage 12 by means of a pivot journal 11. The stand 12 is movable along a path or track 13, 13' provided with guide rails.

When the holding devices 5, 6 are positioned centrally on respective arms, the second arm 10 will diverge from the first arm 8 at an angle of about 20° or 30°.

The holding device 6 is intended to coact with a part of the beam 4 located approximately midway along said beam.

The end-part 4a of the beam 4 carries an electric motor 16, with the tool or abrasive disc, here referenced 17, being mounted on the other end of the beam. The tool may be replaced with a gripping claw or some like device.

The tool 17 and the motor 16 are interconnected by means of a splined shaft 18, shown in a broken line, by means of which torque is transmitted from the rotor to the tool 17, Via a bevel-gear arrangement (not shown).

Linear movement of the robot-beam arrangement along the path 13, 13' is controlled by a motor 20, which in the case of the illustrated embodiment is stationary in relation to a foundation surface 21, although the motor may equally as well be mounted on the beam 1.

Figure 3:
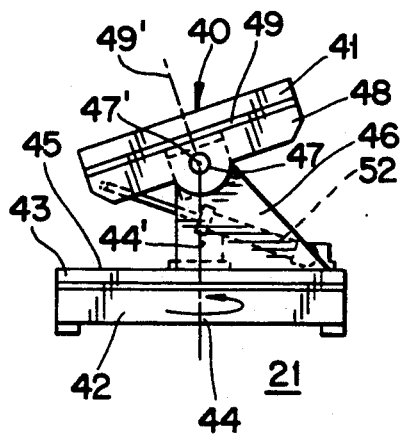
FIG. 3 is a side view of a table assembly.

FIG. 3 is an end-view of the arrangement as seen from the tool-carrying end of the beam, and shows the construction of the second arm 10 which coacts with the second beam-holding device 6. The first arm 8 and the first beam-holding device 5 are of similar construction, except, of course, in the aforementioned alternative embodiment (FIG. 5) in which the beam is journalled to the top of a fixed arm 8.

As will be seen from FIG. 3, the arm 10 has a framework construction which comprises two mutually parallel arm-members 24 and 25. Slideably mounted on each arm-member 24, 25 is a respective slide 22, 23, which together form part of the second beam-holding device 6 coacting with the second arm 10. The slides 22, 23 are rotatably attached to the beam 4 (by journals not referenced) at said midway part of the beam, or alternatively at a beam-location which is closer to the tool-carrying end of said beam, such as to hold the beam between the arm side-members 24, 25 and therewith permit the beam 4 to move relative to the arm 10 along the axial length thereof and also to rotate relative to said arm side-members.

Returning to FIG. 1, in accordance with the preferred embodiment, the first holding device 5 is raised and lowered along the first arm 8 with the aid of a first linearly-acted positioning device, such as a hydraulic piston-cylinder device 30, whereas the second beam-holding device is moved along the second arm 10 with the aid of a second linearly-acting positioning device, such as a hydraulic piston-cylinder device 31. A third linear positioning device, such as a piston-cylinder device 32, is operative to move the robot beam-arrangement backwards and forwards in a slightly curved arcuate movement.

As will be understood from the aforegoing, the tool or abrasive wheel 17, can be raised and lowered around the pivot axle 6' of the holding device 6 with the aid of the piston-cylinder device 30, and also around the pivot axle 5' of the holding device 5 with the aid of the piston-cylinder device 31.

The respective piston-cylinder devices 30, 31 and 32, and also the carriage or stand 12 are each manouvered independently of one another with the aid of a control unit (not shown), in a manner such as to bring the tool or abrasive disc 17 to a desired, pre-determined position, preferably in accordance with a pre-set program, and to move the tool from one position to another in accordance with said program.

As before mentioned, the robot beam may comprise at least two mutually telescopic sections and the beam illustrated is assumed to comprise two such beam-sections 4 and 7, of which the beam-section 7 carries the tool 3 at its free-end 2.

The first and second beam-sections 4,7 are connected for rotation about a common longitudinal axis by means of a toothed ring 14, which forms part of the inventive beam-positioning arrangement and which is driven by a hydraulic rotary motor 15 and which enables the tool to be rotated about its long axis. In the case of the illustrated robot beam the end-part 4' of the beam-section 4, which is held against rotation about its long axis, has provided thereon a flange 14' having provided therein a hole whose shape corresponds to the cross-sectional shape of the beam-section 7 and which has mounted on the defining-surfaces thereof rollers or like devices which guide the axial movement of the beam-section 7 in and out of the beam-section 4 and which also journal the beam-section 7 for rotation about its longitudinal axis relative to the beam-section 4, this rotation being permitted by a toothed ring which connects the first and second sections 4 and 7.

The beam-section 7 is moved axially into and out of the beam-section 4 by means of a fourth linearly acting positioning device, e.g. the piston-cylinder device 19 illustrated schematically in the Figure. Similar to the aforementioned piston-cylinder devices, this device will also be controlled operationally by the aforesaid control means.

Figure 4:
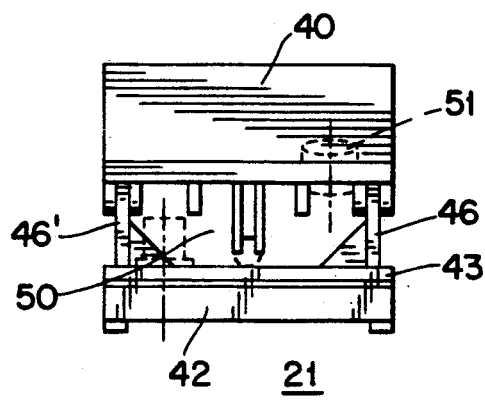
FIG. 4 is a front view of the table assembly shown in FIG. 3.

FIGS. 3 and 4 illustrate a table assembly which comprises a table-top having an upper table surface 40 on which a workpiece (not shown) can be firmly mounted, a stand 42 which rests on the foundation surface 21, and a lower table-part 43 which is rotatably connected to the stand 42.

The lower table-part 43 is journalled on the stand 42 for rotary movement about a vertical shaft 44 and mounted on the upper surface 45 of the lower table-part are bearing blocks 46, 46' on which an intermediate table 48, which supports the table-top 41, is journalled for movement about a horizontal shaft 47.

The intermediate table 48 and the table-top 41 coact pivotally via a shaft 49 which extends perpendicularly to the normal of the upper table-surface 40.

In accordance with the present invention, the imaginary extension of the geometric axis 44' of the vertical shaft 44 and the geometric axis 47' of the horizontal shaft 47 intersect one another.

The geometric axis 49' of the shaft 49 intended for effecting mutual coaction of the intermediate table and the table-top 41 is intended to intersect the geometric axis 47' of the horizontal shaft 47.

The floor stand and the lower table-part can be rotated through an angle of 360°, with the aid of a motor 50, whereas the intermediate table 48 and the table-top 41 can be rotated through an angle of 360°, with the aid of a motor 51.

The motors may be hydraulic motors and may operate in a manner known per se. The motors are also controlled by a control unit.

The intermediate table 48 is rotatably connected to a horizontal shaft journalled on the aforesaid bearing blocks 46, 46' and can be rotated relative to the horizontal plane with the aid of a linear positioning device, such as a hydraulic piston-cylinder device 52. The lower table-part is rotated relative to the floor stand by means of a first hydraulic motor 50, whereas a second hydraulic motor 51 is mounted adjacent a bearing block and secured in the intermediate table, such as to be able to rotate the table-top relative to the intermediate table.

The table-assembly construction enables the workpiece to be twisted, rotated and tilted in a controlled manner.

If preferred, the floor stand or carriage 12 can be driven with the aid of a rack or a drive-spindle.

Figure 2:
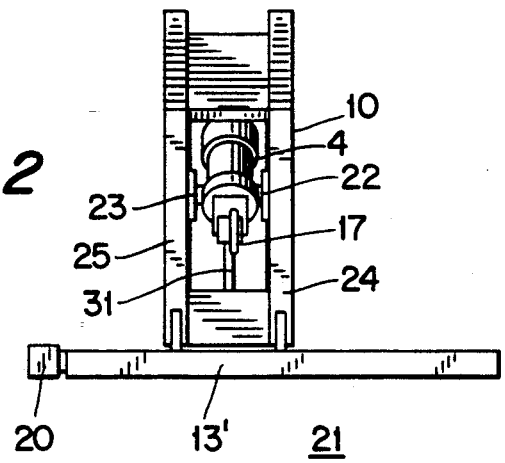
FIG. 2 is a front view of the arrangement shown in FIG. 1.

It will be understood that the linear positioning-devices 19, 30, 31 and 32 of the FIG. 1 and FIG. 2 embodiments may have the form of racks or spindles and that the invention is not limited to the use of hydraulic piston-cylinder devices in this respect.

The aforesaid bevel-gear arrangement is mounted on the extremity of the beam-section 7.

The table assembly can also be mounted on a rail for movement therealong, in the same manner as that described above.

Rotation is effected, advantageously, with the aid of a toothed ring or gear wheel.

The workpiece can be fastened to the upper surface 40 of the table-top 41 with the aid of a centrally located pulling device, e.g. a piston-cylinder device, whose piston rod extends through a centrel hole in the bearing. One end of the piston-rod or pulling rod, can be attached to a fixture or arm.

It will be understood that the invention is not restricted to the described and illustrated embodiment and that modifications can be made within the scope of the following claims.

FIG. 5 illustrates in side-view an embodiment of an arrangement which includes a telescopic robot beam structure supported by a "fixed" holding device or arm 8', by which is meant that the arm 8, is fixed in relation to the floor stand 12. The function of this arrangement is identical to the function of the arrangement according described with reference to FIG. 1, although in the case of the FIG. 5 embodiment movement of the arm 8' is restricted due to its fixed attachment to the stand 12.

FIG. 6 is a schematic side-view of an arrangement of the kind shown in FIG. 1. In the case of the FIG. 6 embodiment, however, the beam 4 is not telescopic and is supported by two arms 8, 10, in the manner described.

I claim:

1. An arrangement for bringing the tool-carrying end of a robot beam (4) to one desired position of a plurality of possible, predetermined positions, characterized in that the arrangement comprises two beam-holding devices (5, 6) which are intended to support the beam (4) at given mutually-space locations along its length and which are journalled (5, 6) to said beam at said locations, at least one of said beam-holding devices (6) being slideably mounted for movement along a first elongated beam-positioning arm (10); and in that one end (11) of said first arm (10) is pivotally connected to a stand (12) which is moveable along a fixed path, the arrangement being such that a pivotal movement of said first arm (10) and a movement of said at least one holding-device (6) along said arm (10) will result in a commensurate change in the positional setting of the tool-carrying end of said beam.

2. An arrangement according to claim 1, characterized in that the second beam-holding device (5) is also slideably mounted for movement along a second arm (8); and in that said second arm (8) is also pivotally mounted (9) to said stand (12).

3. An arrangement according to claim 2, characterized by a motor (16) which is mounted on one end of the beam (4) or beam-structure, and by a tool-holder or the like mounted on the other end of said beam, and by a splined shaft which extends through said beam such as to enable torque generated by the motor to be transmitted to said tool-holder.

4. An arrangement according to claim 2, characterized in that respective arms have a framework configuration; and in that respective holding devices comprise slides mounted on two mutually parallel arm-parts.

5. An arrangement according to claim 1, in which the robot-beam steered by said arrangement comprises at least two mutually-telescopic beam-sections, characterized in that said beam sections are interconnected by means (13) which will enable one section to rotate relative to the other about a longitudinal axis common to said at least two sections.

6. An arrangement according to claim 5, characterized in that the first and second beam-holding devices (5, 6) are intended to be mounted on a first (4) of said beam-sections.

7. An arrangement according to claim 6, characterized by a linearly-acting positioning device, such as a hydraulic piston-cylinder device, which functions to move the second beam-section into and out of the first beam-section.

8. An arrangement according to claim 6, characterized by a flange which is intended to be fitted to that end of the first beam-section located adjacent the second beam-section and which has provided therein a hole which corresponds to the cross-sectional shape of said adjacent end of the second beam-section, wherein the defining surfaces of said hole have mounted thereon guiderollers for rotationally rigid-coaction with the second beam-section; and in that said flange coacts with a rotatable toothed ring.

9. An arrangement according to claim 6, characterized by linearly acting positioning devices, for example hydraulic piston-cylinder devices, for moving said first and second holding devices (5, 6) along their respective arms (8, 10).

10. An arrangement according to claim 9, characterized by a flange which is intended to be fitted to that end of the first beam-section located adjacent the second beam-section and which has provided therein a hole which corresponds to the cross-sectional shape of said adjacent end of the second beam-section, wherein the defining surfaces of said hole have mounted thereon guide-rollers for rotationally rigid-coaction with the second beam-section; and in that said flange coacts with a rotable toothed ring.

11. An arrangement according to claim 9, characterized by a linearly-acting positioning device, such as a hydraulic piston-cylinder device, which functions to move the second beam-section into and out of the first beam-section.

12. An arrangement according to claim 9, characterized by a further linearly acting positioning device (32), such as a hydraulic piston-cylinder device, which is mounted between one end of the second arm (10) and the first holding device (5), or is attached at one end adjacent said first holding device.

13. An arrangement according to claim 12, characterized in that the first and second holding devices (5, 6) are each rotatably journalled to the beam, or to one beam-section, and in that each said holding device comprises a slide intended for movement along slide-surfaces on a respective arm.

14. An arrangement according to claim 12, characterized by a flange which is intended to be fitted to that end of the first beam-section located adjacent the second beam-section and which has provided therein a hole which corresponds to the cross-sectional shape of said adjacent end of the second beam-section, wherein the defining surfaces of said hole have mounted thereon guide-rollers for rotationally rigid-coaction with the second beam-section; and in that said flange coacts with a rotatable toothed ring.

15. An arrangement according to claim 5, characterized by a flange which is intended to be fitted to that end of the first beam-section located adjacent the second beam-section and which has provided therein a hole which corresponds to the cross-sectional shape of said adjacent end of the second beam-section, wherein the defining surfaces of said hole have mounted thereon guide-rollers for rotationally rigid-coaction with the second beam-section; and in that said flange coacts with a rotatable toothed ring.

16. An arrangement according to claim 5, characterized by a linearly-acting positioning device, such as a hydraulic piston-cylinder device, which functions to move the second beam-section into and out of the first beam-section 17. An arrangement according to claim 5, characterized by a motor (16) which is mounted on one end of the beam (4) or beam-structure, and by a tool-holder or the like mounted on the other end of said beam, and by a splined shaft which extends through said beam such as to enable torque generated by the motor to be transmitted to said tool-holder.

18. An arrangement according to claim 5, characterized in that respective arms have a framework configuration; and in that respective holding devices comprise slides mounted on two mutually parallel arm-parts.

19. An arrangement according to claim 1, characterized by a motor (16) which is mounted on one end of the beam (4) or beam-structure, and by a tool-holder or the like mounted on the other end of said beam, and by a splined shaft which extends through said beam such as to enable torque generated by the motor to be transmitted to said tool-holder.

20. An arrangement according to claim 1, characterized in that respective arms have a framework configuration; and in that respective holding devices comprise slides mounted on two mutually parallel arm-parts.

* * * * *